(12) United States Patent
MacPherson

(10) Patent No.: US 7,800,615 B2
(45) Date of Patent: Sep. 21, 2010

(54) UNIVERSAL TIMELINES FOR COORDINATED PRODUCTIONS

(75) Inventor: Steve MacPherson, London (GB)

(73) Assignee: AUTODESK, Inc., San Rafael, CA (US)

( * ) Notice: Subject to any disclaimer, the term of this patent is extended or adjusted under 35 U.S.C. 154(b) by 951 days.

(21) Appl. No.: 11/339,422

(22) Filed: Jan. 25, 2006

(65) Prior Publication Data

US 2007/0171224 A1    Jul. 26, 2007

(51) Int. Cl.
  *G06T 11/20* (2006.01)
  *G06F 3/00* (2006.01)
(52) U.S. Cl. ............... 345/440; 345/473; 715/200; 715/731
(58) Field of Classification Search ........... 345/440, 345/473; 715/731, 500, 202
See application file for complete search history.

(56) References Cited

U.S. PATENT DOCUMENTS

| | | | |
|---|---|---|---|
| 6,204,840 B1 * | 3/2001 | Petelycky et al. | 715/202 |
| 6,421,067 B1 * | 7/2002 | Kamen et al. | 715/719 |
| 6,544,293 B1 * | 4/2003 | Ohanian | 715/203 |
| 6,600,501 B1 * | 7/2003 | Israel et al. | 715/810 |
| 6,718,386 B1 * | 4/2004 | Hanfland | 709/225 |
| 6,990,637 B2 * | 1/2006 | Anthony et al. | 715/851 |
| 7,222,300 B2 * | 5/2007 | Toyama et al. | 715/723 |
| 7,432,940 B2 * | 10/2008 | Brook et al. | 345/629 |
| 7,434,155 B2 * | 10/2008 | Lee | 715/203 |
| 2004/0027371 A1 * | 2/2004 | Jaeger | 345/716 |
| 2004/0205498 A1 * | 10/2004 | Miller | 715/501.1 |
| 2006/0066610 A1 * | 3/2006 | Asano et al. | 345/419 |
| 2006/0288288 A1 * | 12/2006 | Girgensohn et al. | 715/716 |

* cited by examiner

*Primary Examiner*—M Good Johnson
(74) *Attorney, Agent, or Firm*—Patterson & Sheridan, LLP

(57) ABSTRACT

Embodiments of the invention provide a universal timeline application that may be used to effectively manage the access and display of content related to multiple aspects of a production. The universal timeline application provides an interface presenting users with a visualization of all the different data elements of a production, represented in an intuitive, easily navigable, three-dimensional display. Icons representing data elements may be plotted on a three dimensional grid, wherein each axis of the grid represents a different dimension of the data elements. Metadata defined for a given data element specifies a location on the three dimensional grid to plot the given data element.

20 Claims, 10 Drawing Sheets

UNIVERSAL TIMELINES FOR COORDINATED PRODUCTIONS

BACKGROUND OF THE INVENTION

1. Field of the Invention

The present invention generally relates to computer software. More specifically, the present invention relates to computer software applications configured to facilitate the coordination, production and development of multimedia projects.

2. Description of the Related Art

Developing entertainment productions has become a complex and sophisticated endeavor. Whether in the form of a commercial, television show, documentary, movie, video game, or otherwise, multimedia projects often require the coordination and cooperation of a number of different entities. For example, developing an entertainment production often requires managing the creation and use of both digital elements (such as the use of computer generated images (CGI) created by a special effects studio) and non digital elements (such as filmed live-action sequences, scripts, storyboards and artwork elements, created by various other entities).

Digital elements have become an increasingly common component of entertainment productions. For example, small productions may often include a few hundred shots that incorporate CGI elements and large "blockbuster" type productions often have thousands of CGI elements that make up entire scenes or even the entire production. Managing the development of these digital elements and the post-production process of composing live-action sequences with digitally generated images requires a producer to monitor the state of each shot as it progresses through different digital pipelines.

At the same time, managing non-digital elements such as performance scripts, storyboards, and artwork generated as part of the production process also presents significant challenges. For example, determining which version of a script corresponds to a storyboard created for the script, or even determining which version of the script is the most current one is often difficult to ascertain. More generally, developing a entertainment production requires coordination across multiple aspects of the production, such as coordinating the actions of storyboard artists with CGI animators and coordinating the actions of script writers with production staff and creative talent, to name but a couple of many possible examples.

One key approach to managing both the digital and non-digital elements of a production involves the concept of a production timeline. The production timeline defines the order in which elements are arranged to form a final production. For example, the production timeline for typical movie progresses from an opening title sequence through to the final closing credit. In between these two points is a sequence of shots. Each shot may be composed from live action film footage, animated sequences, and digital elements such as CGI images or renderings.

Typically, an editorial department is tasked with combining the digital and non-digital elements to generate a complete production. Several software applications have been developed to represent multimedia elements created for a production. For example, some applications have been developed that represent a production timeline using a sequence of shots proceeding from the first shot of a production to the ending shot. Other applications have built upon this approach by allowing the production timeline to include multiple versions of various video clips related to a particular shot. While this latter approach addresses the needs of an editorial department in composing the final product, it fails to address the requirements of related departments that may be producing material in parallel, or even in advance of the editorial department. For example, script, storyboard artists, pre-visualization, CGI artists, and final compositing are just a few of the departments that do not have access to the data or applications used by the editorial department. Likewise, the production timeline provided by these types of software applications fail to provide production personnel (e.g., producers, directors, production company executives) with the ability to visualize the outputs of the various parties participating in the production and/or to recombine different elements of the production in a way that allows flexibility, creativity and control in the creating the final production. Thus, current approaches fail to provide an application that allows production staff to manage and coordinate all the disparate, yet related, activity that occurs during the course of a media production.

Accordingly, there remains a need for software applications configured to better facilitate the coordination, production, and development of multimedia projects.

SUMMARY OF THE INVENTION

Embodiments of the invention provide a universal timeline application that allows users to coordinate and manage multiple aspects of a production project using an intuitive, easily navigable interface. In one embodiment, the production may be a movie, television production, commercial, private production, video game, or other multimedia project. Importantly, embodiments of the present invention may be adapted to provide an interactive visualization of other datasets that may be represented using a three-dimensional (3D) axis.

When used to manage or coordinate a multimedia production, the universal timeline application provides various users with an interactive visualization of elements from a production database. The production database contains all of the digital and non-digital elements created, generated or obtained for use in the production. Digital elements may include any content intended to be included final production generated by a computer, e.g., sound or visual effects, CGI images, renderings, or animation sequences. Non-digital elements typically include a production script, artwork, storyboards, filmed sequences, etc. Note, however, that although referred to as "non-digital," each of these elements may be represented in a digital form in the production database. For example, the production script may be represented as a word-processing document.

In one embodiment, the universal timeline is displayed to users as a 3D grid that includes an X-, Y-, and Z-axis. Each axis of the grid may be used to represent a different aspect of the production. Icons representing both the digital and non-digital elements of a multimedia production are displayed on the 3D grid at points representing where each individual data element falls on the universal timeline. For, example, the X-axis may represent the production timeline. That is, the X-axis may represent the timeline of a multimedia production from the opening title sequence to the final closing credits. Accordingly, traversing the universal timeline along the X-axis moves through data elements in the sequence of the production timeline. The Y-axis may represent different versions of a given data element. Thus, as a particular artwork image, storyboard, CGI animation, or portion of script evolves during the course of production, prior and subsequent versions the element may be accessed by traversing along the Y-axis. Finally, the Z-axis may represent different "stages" of the production. In one embodiment, stages may be defined to represent different aspects of the production. For example, stages for a typical film production could include "Script," "Artwork," "CGI" and "Film Composite" stages. However, the stages defined for the universal timeline may be arbitrarily defined to suit the needs of a particular production.

The icons may be displayed on the universal timeline to represent the position of the corresponding data elements, relative to one another. Thus, users may determine at a glance how a given data element of the production relates to the production as a whole, based on its position on the universal timeline. For example, an icon representing a portion of the script might be plotted on the universal timeline at a point indicating where the portion of the script occurs (the X-axis location), which version of the script is associated with the icon (the Y-axis location), and indicating that the icon is associated with the "script" stage (the Z-axis location). Further, the universal timeline application may provide a visualization of related data elements. For example, by selecting an icon on the "script" stage, the universal timeline application may highlight a set of related icons from other stages (e.g., artwork related to the selected portion of the script or film sequences where the selected portion of the script is performed, etc.)

Access to data elements from the production database may be restricted based on user identity, allowing multiple unrelated (or even competing) entities to access data from the production database. For example, consider two different CGI animation studios may simultaneously generating different CGI animation sequences for a given production, each studio may access elements from the production database related to CGI elements it produced, but may not access elements related to the work produced by the other studio. At the same time, both CGI studios may have access to artwork, storyboard or script elements or to composites of live action footage and the CGI elements produced by each studio.

In one embodiment, users navigate through the universal timeline application using a navigational sextant. The sextant allows a user interacting with the universal timeline to traverse any icons plotted along any of the X-, Y-, or Z-axes. Additionally, a user may select one or more icons falling on the universal timeline in order to retrieve display the data element from the production database associated with the particular icon. For example, by selecting an icon from the "script" stage, a portion of text represented by the icon may be displayed. Similarly, by selecting an icon from a "composite" stage, a composite of CGI elements and live action film footage may be displayed.

Further, by using the universal timeline application, a decision maker, such as a director or producer, may manage and coordinate the overall production. For example, an art director may approve a final version of artwork used by the CGI studios before digital elements are generated, a director may rearrange the production timeline (e.g., reorder different sections of the script), or coordinate any other aspect of a given.

DETAILED DESCRIPTION OF THE PREFERRED EMBODIMENTS

Embodiments of the invention provide a universal timeline application that may be used to effectively coordinate and manage a production project. In one embodiment, the universal timeline application presents users with a visualization of various digital and non-digital elements of a multimedia production, using an intuitive, easily navigable, three-dimensional (3D) display.

The following discussion focuses on an embodiment of a universal timeline application used to facilitate the coordination and management of a multimedia production, such as a motion picture. However, embodiments of the invention may be adapted to provide a universal timeline application for other types of projects, including other media projects such as a computer game, a television show, or a commercial advertisement, etc. Further, embodiments of the invention may be adapted to manage and coordinate other projects that involve a variety of independent entities or require a high degree of planning. For example, a complex construction project involving numerous contractors may be represented using a universal timeline application configured according to the present invention. Doing so may provide a general contractor or other manager with a visual representation of the current state of many different elements of the construction project. Thus, such a visual representation allows the manager to more easily coordinate the diverse requirements and deadlines of multiple sub-contractors. More generally, embodiments of the invention provide a universal timeline application that allows users to visualize and access data elements plotted across a 3D dimensional grid.

Figure 1:
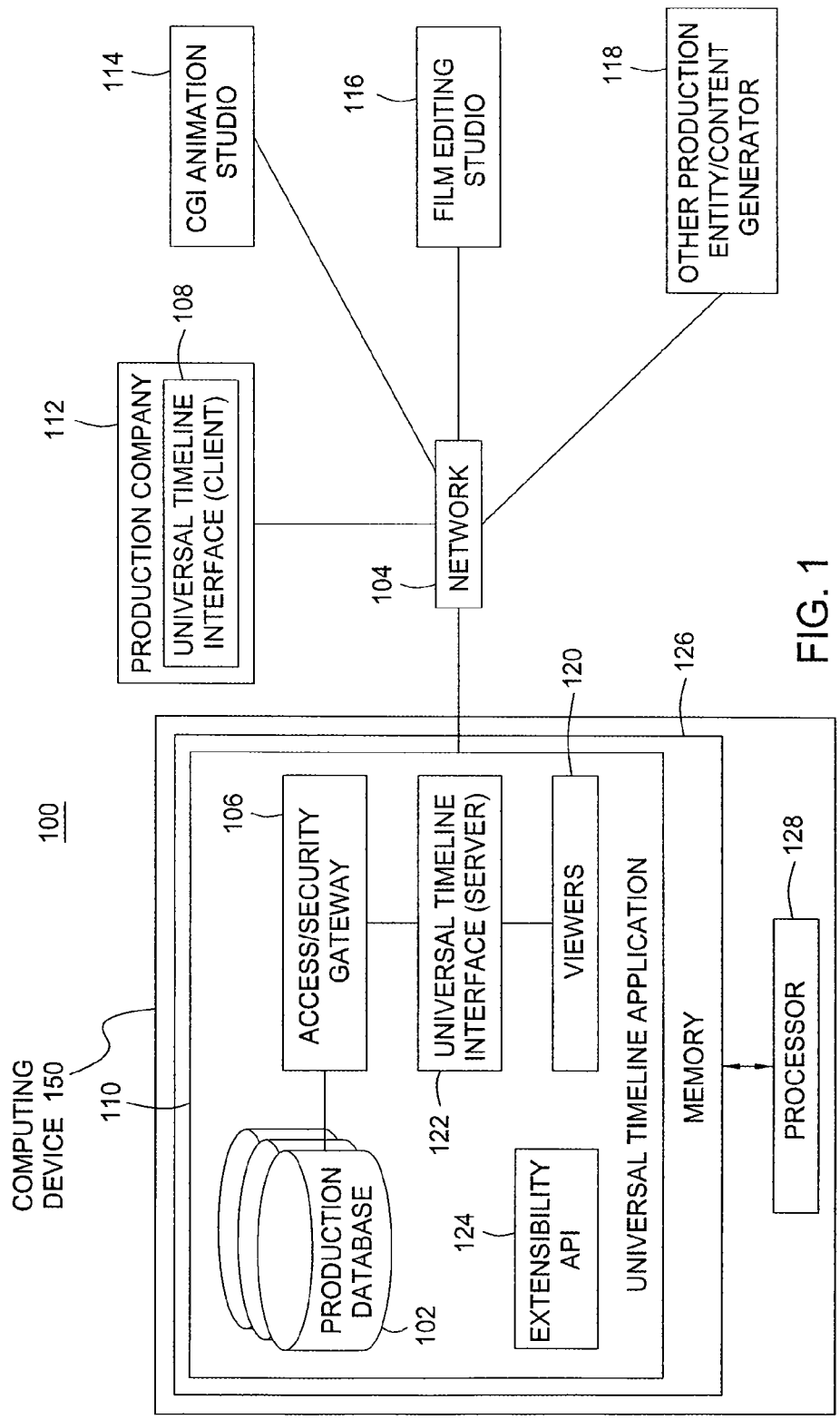
FIG. 1 is a block diagram illustrating a computing environment configured to manage a multimedia production, according to one embodiment of the invention.

FIG. 1 is a block diagram illustrating a computing environment 100 configured to manage a complex multimedia production, according to one embodiment of the invention. As shown, the computing environment 100 includes a computing device 150. The computing device 150 includes a memory 126 and a processor 128. The memory 126 includes the universal timeline application 110 that includes, without limitation, production database 102, access/security gateway 106, universal timeline interface (server) 122, content viewers 120, and extensibility API 124. Also shown are a number of entities that would typically participate in the production of a multimedia project. Each of these entities may interact with universal timeline application 110 over the course of creating a particular multimedia project. Illustratively, a production company 112, a CGI animation studio 114, an editing studio 116, and other production entity or content generator(s) 118 may each communicate with the universal timeline application 110 over network 104. In one embodiment, the universal timeline application 110 includes both a client portion (illustrated as universal timeline interface 108) and a server portion 122. As is well-known, the client-server architecture provides a common form of a distributed computer system in which a software application is split between server tasks and client tasks. Typically, a client sends requests to a server according to an agreed upon protocol requesting some information or action, and the server responds. However, embodiments of the invention may be adapted to other distributed computing architectures, such as peer-to-peer networks or grid architectures.

The client portion 108 may comprise a web-based application delivered to users from a web server over a network 104, or may include a custom-built application. Further, the components illustrated as part of the universal timeline application 110 may be implemented by software applications executing on existing computer systems, e.g., desktop computers, server computers, laptop computers, tablet computers, and the like. The software applications described herein, however, are not limited to any currently existing computing environment or programming language, and may be adapted to take advantage of new computing systems as they become available. Additionally, the universal timeline application 110 illustrated in FIG. 1 may communicate over any data communications network 104, including local area networks and large, wide area networks, such as the Internet.

In one embodiment of the present invention, a computer-readable medium contains a program which, when executed by a processor, performs operations for managing and coordinating a production, including the steps of storing a plurality of data elements related to the production in a production database, displaying a universal timeline represented as a three dimensional grid, where each axis of the grid constitutes a different dimension of the data elements stored in the production database, and displaying a first data locket on the universal timeline to represent a first data element stored in the production database, where metadata defined for the first data locket specifies a location on the universal timeline of the first data element.

In one embodiment, the universal timeline application 110 provides a software application configured to manage the digital and non-digital data elements related to a multimedia production. As described above, digital elements may include any computer-generated content intended to be included final production, e.g., sound or visual effects, CGI images, renderings, or computer-generated animation sequences. Non-digital elements may include a production script, hand-drawn artwork or storyboards, film clips, etc. Additionally, a data element may include a combination both digital and non-digital elements. For example, a "composite" video clip may combine live action sequences with computer generated elements. As used herein, a "data element" refers any of these items created or obtained over the course of a production, or others, or combinations thereof stored in the production database 102. Preferably, the production database 102 may be provided using the Toxik™ node-based collaborative software for interactive film compositing (and associated utilities) available from Autodesk®, Inc.

Viewers 120 include any application that allows a user interacting with universal timeline interface 108 to view data elements contained in production database 102. The API 124 allows users to define elements of a universal timeline to provide a 3D representation of data elements from the production database 102. Data elements may be exchanged between the client 108 and universal timeline application 110 in both directions. Thus, the universal timeline client 108 can push set, version, or stage data to the database 102 or it can pull this information from the database 102. Further, such exchanges may occur simultaneously. For example, a new Edit Decision List (EDL) that rearranges the order of shots in a particular timeline may be transmitted to the timeline application 110 while the latest animation sequences or storyboard images are being retrieved. Also, the database 102 may be configured to maintain a master list of appropriate viewers. In one embodiment, all data elements checked into the database 120 may be associated with one or more entries in a viewers table. This way, when a user requests to access data elements represented in some form, the correct viewer 120 used to view the data is known. Additionally, the extensibility API 124 may provide a mechanism for adding user defined viewers and entries in the viewers table. This may be done to ensure all users have the ability to use the viewers according to individual preferences.

Access/security gateway 106 may restrict the data elements that a given user may access from the production database 102. For example, a screenwriter may be limited to accessing data elements representing portions of the script, and CGI animation studio 114 may be limited to accessing, viewing or updating animation renderings generated by the CGI animation studio 114. At the same time, a producer, director, or other decision-makers may have access to the complete set of data stored by production databases 102 and may also have the authority to set the access restrictions for other production entities.

Figure 2:
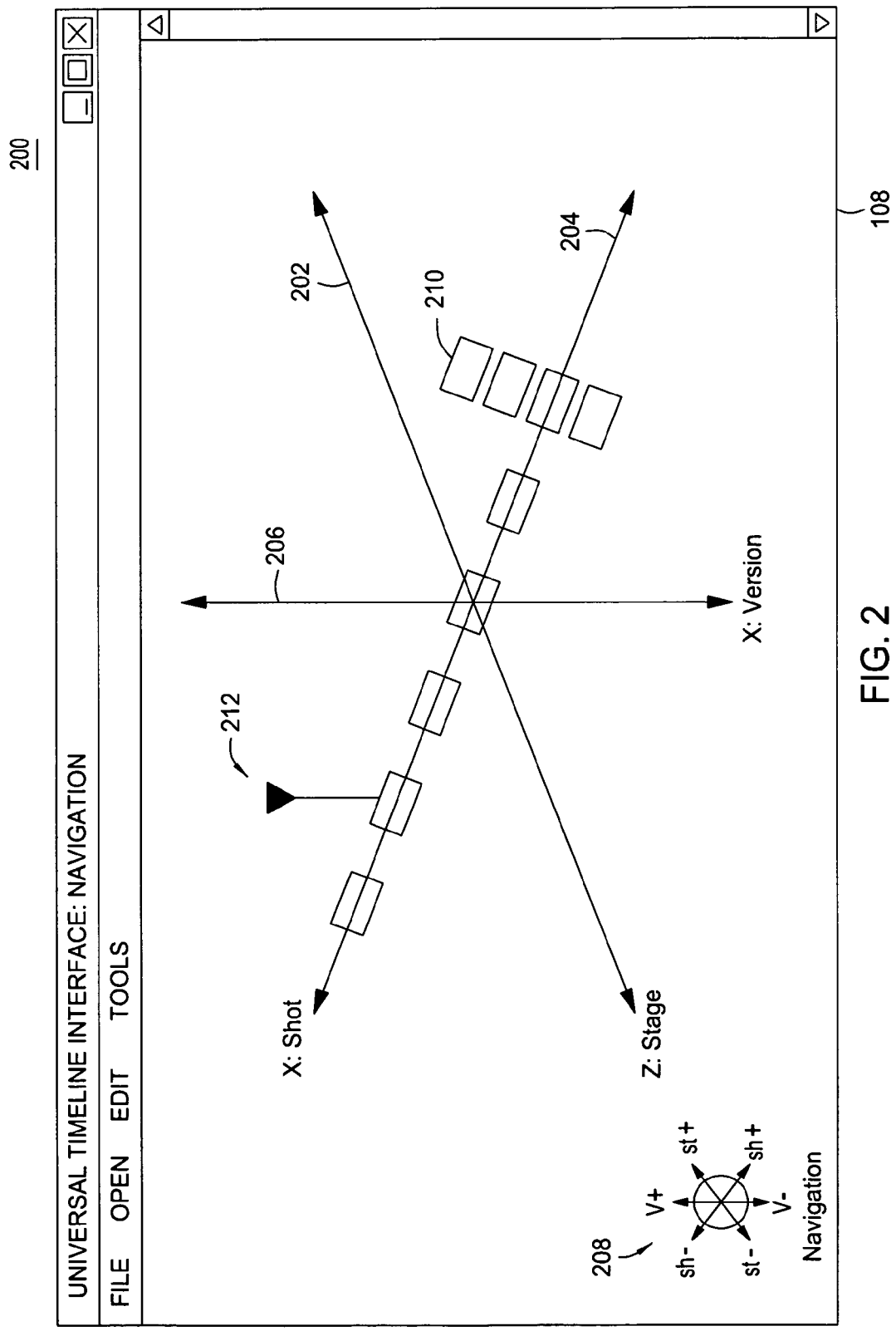
FIG. 2 illustrates an exemplary screenshot view of a universal timeline interface, according to one embodiment of the invention.

FIG. 2 illustrates an exemplary screenshot 200 of a universal timeline interface 108, according to one embodiment of the invention. As shown, interface 108 provides a visualization of data elements contained in production database 102. The interface 108 displays a universal timeline laid out using a 3D grid that includes an X-"Shot" axis 204, a Y-"Version" axis 206, and a Z-"Stage" axis 202. The 3D grid conveys the relative states of production, and relationships among, the displayed data elements. The grid displayed to a particular user may include a single timeline of a chosen stage or many stages, each laid out along a different timeline. Alternatively, it could also represent the timeline defined according to a specific user's preferences or according to permissions specified for a particular user (e.g., the animators may have access to the animations and VFX stages, not have access to the script stage).

A user may traverse along the X-axis 204 to step through the production timeline. The six rectangular icons displayed along the X-axis 204, each represent a similar type of data element, arranged according to the production timeline. For example, the icons may each represent a shot of a movie beginning with an opening title shot at one end of the axis 204 to the closing credits at the other end of the X-axis 204. Thus, traversing through the universal timeline interface 108 along the X-axis 204 allows a user to step through the contents of the production database, ordered according to the production timeline.

Traversing along the Y-axis axis 206 allows a user to step through any previous or future versions of a given data element. As shown in FIG. 2, the Y-axis 206 displays four rectangular icons representing different versions of the data element 210. For example, data icon 210 represents a version of the data element 210 twice removed from the one displayed directly on the X-axis 204.

Points on the Z-axis 202 are used to represent different collections of data elements related to some aspect of the production. Each defined point on the Z-axis 202 is referred to herein as a "stage." The actual defined points, i.e., "stages" defined along the Z-axis may be tailored using API 124 to suit the needs of a particular production. For example, the "stages" defined for a typical film production could include, among others, a "script" stage, an "artwork" stage, a "CGI sequence" stage and a "composite" stage. The "script" stage may include all of the data elements associated with the production script, and the "artwork" stage may include of the artwork elements created for the production. In each case, the arrangement of these elements on a "stage" flows along the X-axis 204, according to the production timeline, and different versions of a given data element may be displayed along the Y-axis 206 of the universal timeline.

Generally, stages are defined relative to a given project, as a fixed department or group responsible for a specific set of deliverables. Thus, one stage is provided for the script writer (or writers) and another for animators. The stages are fixed, relative to one another, and each STAGE may have its own associated timeline. A set is a grouping of lockets 210 (each laid out on the appropriate timeline) based on the stage, version and/or other criteria. This allows users to view elements of the project assembled in real-time based on the view permissions/criteria of the person requesting the information. The set of interest for a specific individual/party would change as new material presents itself to the database or as decisions on approval/rejection of work are made.

Thus, the universal timeline interface 108 provides users with a visualization of data elements available from the production database 102 organized in an intuitive, easily navigable manner. By navigating in different directions along one of the X-, Y-, and Z-axes, a user may navigate through any aspect of the production. For example, a writer may access the recent versions of a production script or a producer may access and approve different versions of artwork to provide to a CGI studio 114. In turn, the CGI studio 114 may access the artwork and generate CGI animation sequences, ultimately stored in the production database 102. Still further, the editing studio 116 may access the CGI sequences and live action sequences in order to generate the final, composite film sequences. Editing studio 116 may also perform actions such as accessing CGI sequences and live action sequences in order to generate a new Edit Decision List. At the same time, the production company 112 may manage and coordinate the work product of each of these entities, as well as monitor the overall state of the production across multiple "stages" using the universal timeline interface 108.

Users may select an icon displayed by the universal timeline interface 108 (also referred to herein as a "data locket") to view the corresponding data element from production database 102. In one embodiment, a data locket is used to provide the basic data object representing an element from the production database 102. For example, if a user selects a data locket displayed on the script "stage," the universal timeline interface 108 may be configured to display the content of the production script using an appropriate viewer 120 (e.g., a word-processing application). Similarly, if a user selects to view a data locket from an "artwork" or "storyboard" stage, the interface 108 may display the corresponding images retrieved from production database 102 using an image-viewing application. One embodiment of a data locket is described in greater detail below in conjunction with FIG. 3A.

In one embodiment, a user may navigate through the display of a universal timeline for a given production using navigation sextant 208. By selecting any of the navigation points of sextant 208, a user may navigate through the universal timeline along the X-axis 204, Y-axis 206, or Z-axis 202, as desired. For example, by selecting the "sh-" point of sextant 208 twice, the view displayed by interface 108 would shift data locket 212 to the origin point of the universal timeline interface 108. The sextant 208 allows a user to navigate through different "stages" defined for the universal timeline (e.g., from a script stage, to a storyboard stage, to an artwork stage, etc.), by traversing along the Z-axis 202. Similarly, a user may navigate along the X-axis 204 and Y-Axis using sextant 208.

Figure 3A:
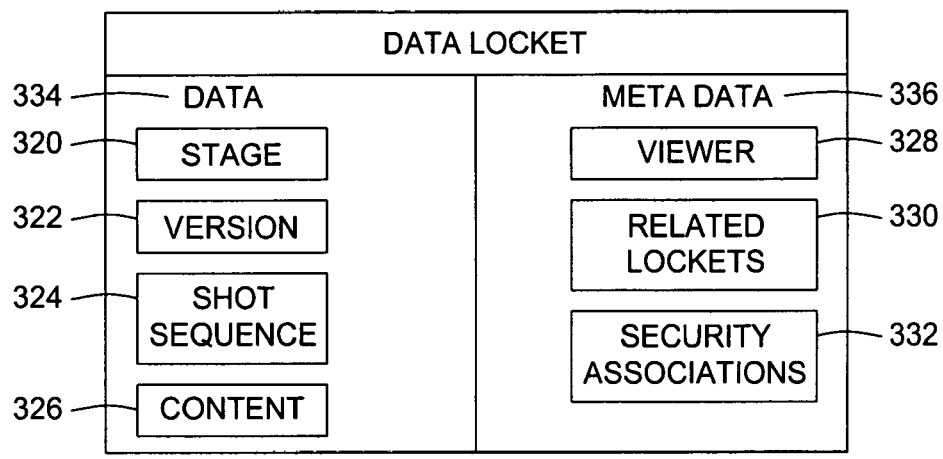
FIG. 3A illustrates an embodiment of a data structure representing a data locket.

FIG. 3A illustrates an embodiment of a data structure representing a data locket 300. In one embodiment, data 334 includes shot sequence data 324, version data 322, and stage data 320. These three data elements correspond, respectively, to the X-, Y-, and Z-axes of the universal timeline interface 108 illustrated in FIG. 2. Thus, these three elements may be used to place an icon on the universal timeline.

Additionally, content 326 identifies the data element stored in production database 102 corresponding to a given data locket 300. As described above, data elements in the production database 102 may include computer generated elements such as sound or visual effects, CGI images, renderings, or animation sequences, and may also include non-digital elements such a production script, artwork, storyboards, filmed sequences, and further, data elements may include combinations of both digital and non-digital elements. Metadata 336 identifies a viewer application 328 associated with data locket content 326. For example, the viewer application 328 may identify that a type of viewer that should be used to view data locket content 326. Common viewers include text viewers, image viewers, video viewer, and the like. Viewer 328 may also contain information on who has viewed/has viewers open regarding a particular data locket 300. Related data locket metadata 330 is used to associate the content of one data locket with other data lockets. Returning to the example of a data locket used to represent a portion of a production script, the related data locket metadata 330 may indicate other data lockets related to the portion of the script. Thus, the data locket representing the storyboards or artwork developed for the portion of the script, any actual film sequences where the script is performed by actors, or composite sequences combining live action sequences with digitally generated effects may be referenced by related data locket metadata 330. Security associations 332 may identify which users are authorized to view or modify the content 326 of a particular data locket 330.

Figure 3B:
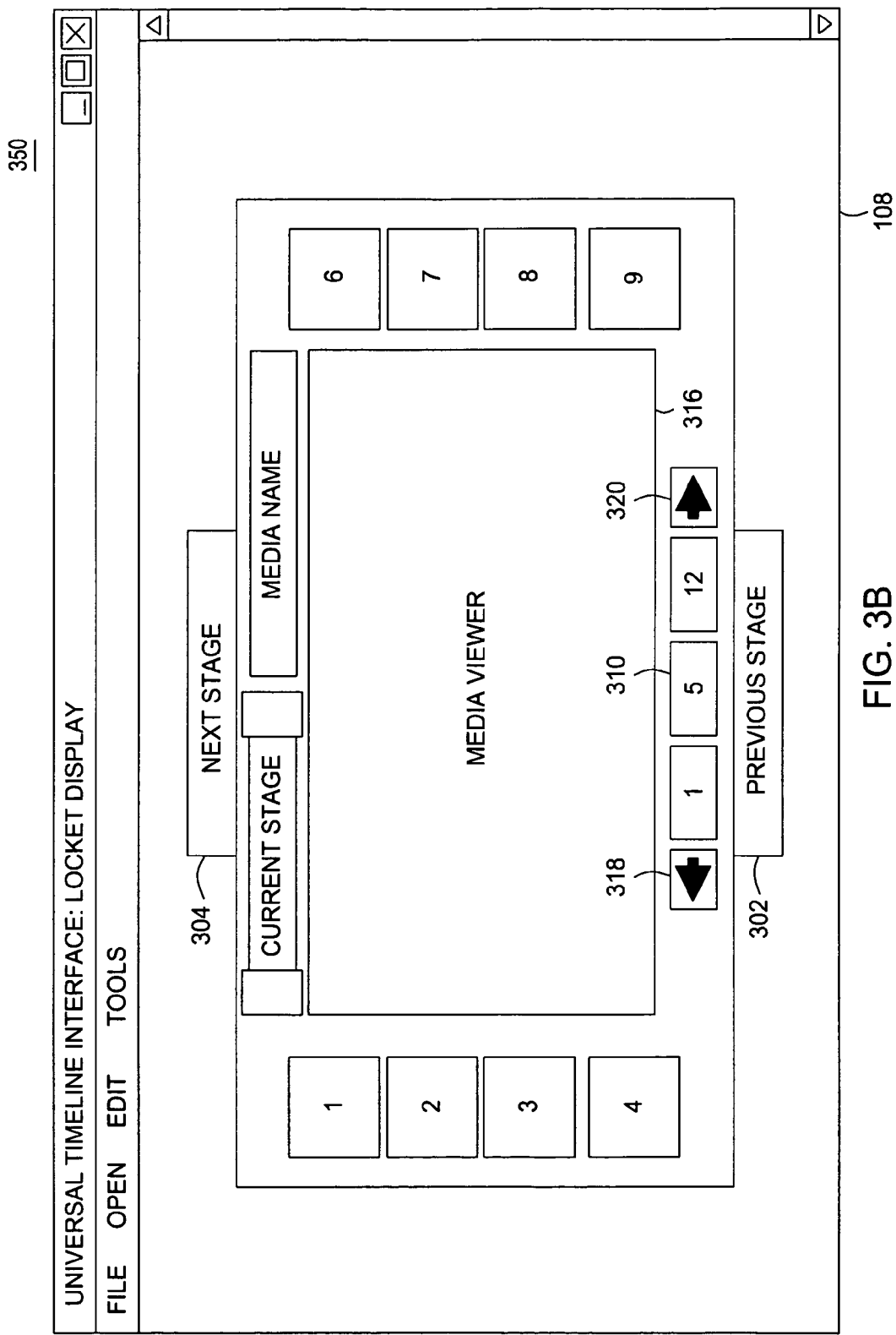
FIG. 3B illustrates an exemplary screenshot view of an interface for viewing a data locket, according to one embodiment of the invention.

FIG. 3B illustrates an exemplary screenshot 350 of an interface for viewing a data locket 300, according to one embodiment of the invention. In one embodiment, the universal timeline interface 108 may display the interface illustrated by screenshot 350 in response to a user selecting of a particular data locket 300 displayed by the universal timeline interface 108. The content 326 of a data locket may be rendered by a viewer application in display area 316. For example, after a user selects a data locket from the "script" stage, the actual text of the production script would be displayed in display area 316. Similarly, if a user selected a data locket from a "composite sequences" stage a viewer 120 would play a video of the selected sequence in display area 316.

Additionally, users may navigate through the universal timeline along each of the X-, Y- or Z-axes to change the data locket currently displayed in display area 316. For example, buttons 318 and 320 may be used to traverse along the X-axis, based on the data locket displayed in display area 316. For example, a user may advance forwards or backwards through representing portions of a production script using buttons 318 and 320. That is, buttons 318 and 320 may be used to traverse the Y-axis of the universal timeline. For example, consider a scene of dialogue between two actors, beginning with a data locket representing the production script, a user may navigate along the Z-axis 202 through stages defied for artwork, storyboards, video clips, CGI, animations, and composite sequences, and final production sequences, etc., all related to this scene of dialogue. Next stage display 304 and previous stage display 302 may indicate which stage the buttons 318 and 320 are adjacent to the current one on the universal timeline.

Figure 4:
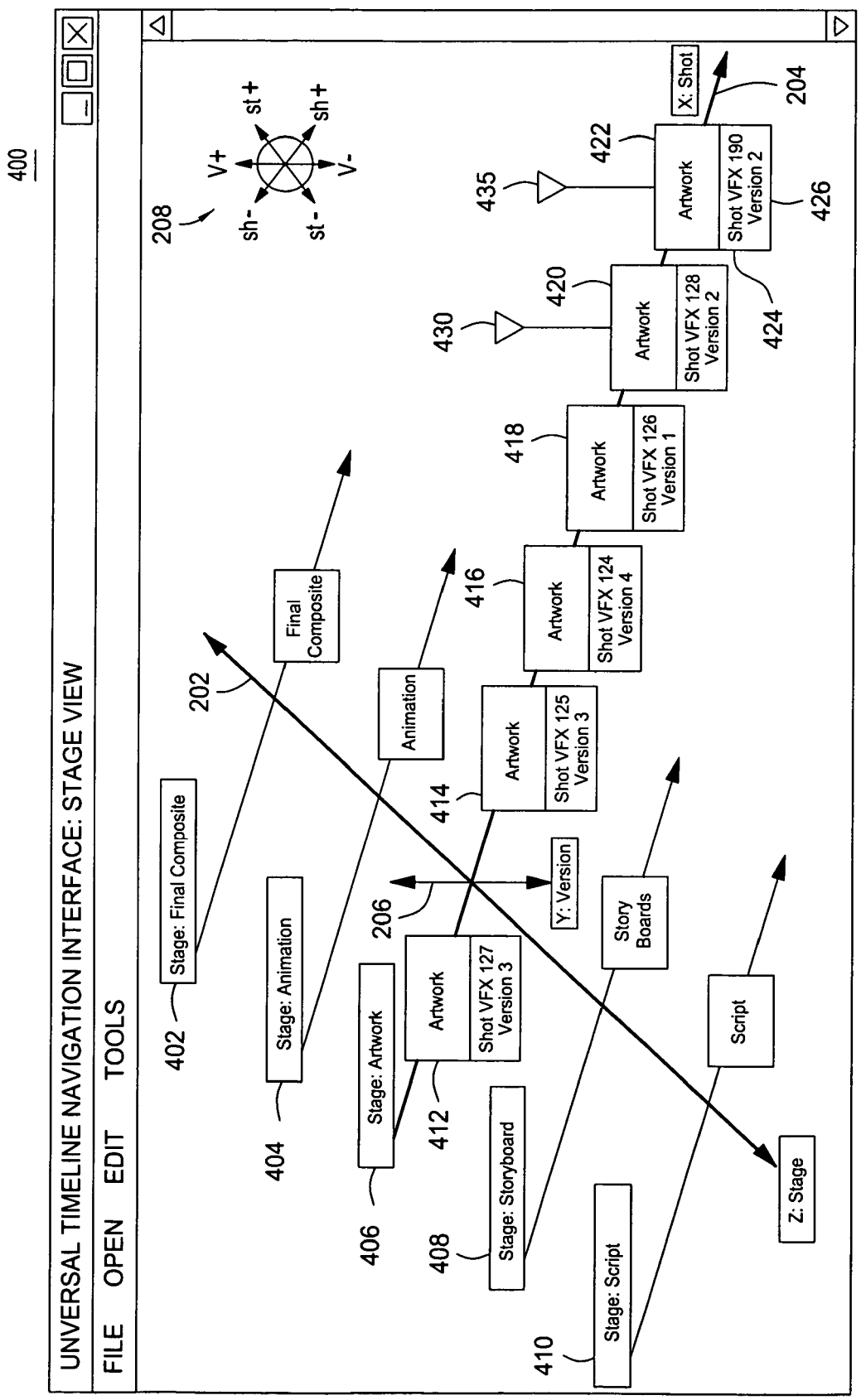
FIG. 4 illustrates another exemplary screenshot of the universal timeline interface first illustrated in FIG. 2, according to another embodiment of the invention.

FIG. 4 illustrates another exemplary screenshot 400 of the universal timeline interface 108, according to another embodiment of the invention. As shown, FIG. 4 displays a universal timeline interface that includes stages 402-410 defined for a given production. For example, screenshot 400 illustrates a "stage view," highlighting the data lockets 412-422 associated with the "artwork" stage. Thus, the data lockets for the "artwork" stage 406 are each highlighted and convey sequence information 424 and version information 426.

As described above, each data locket displayed in the universal timeline interface 108 is associated with a given stage, and provides an iconic representation of a data element available in the production database 102. For example, data locket 422 provides an iconic representation of an "artwork" data element associated with a multimedia production. In this case, the artwork element represents a "VFX" (visual effects) shot, "sequence 190," "version 2." FIG. 4 illustrates the difficulty in aligning the timeline pf a production. For example, shots VFX 127 and VFX 125 appear in what would seem the improper order. However, the ordering of shots is dictated by editorial needs, thus shot ordering is not fixed by shot number. In one embodiment, a virtual numbering scheme may be used to represent a current sequential numbering of shots to indicate location and the virtual numbering fixes locket position relative to the beginning and ending of any particular representation of a given timeline. The virtual numbering would also allow different stages of a production to line themselves up with each other based on the timing of the narrative, not on the arbitrary name given to a shot when that shot was created.

The data lockets displayed on universal may be selected individually or in groups. For example, flag selection arrows 430 and 435 indicate that the data lockets 420 and 422 are currently selected. Once a user selects a desired data locket, the user may perform actions regarding the selected data locket. For example, a user may flag the data elements 326 corresponding to a given data locket as needing further production work, create a new version of a given data locket, approve artwork or animations to be used by CGI studio 114, etc, or perform any other action required to manage or coordinate the overall production.

In addition to the "artwork" stage, screenshot 400 also includes a "script" stage 410, a "storyboard" stage 408, and "animation" stage 404, and a "final composite" stage 402. However, other stages may be defined for a given production. For example, in addition to the stages illustrated in screenshot 400 may include other sets of data elements related to the overall production such as pre-visualization data, bid-submissions data, modeling data, camera table plates, temporary compositions, final compositions, rendering, etc.

Figure 5:
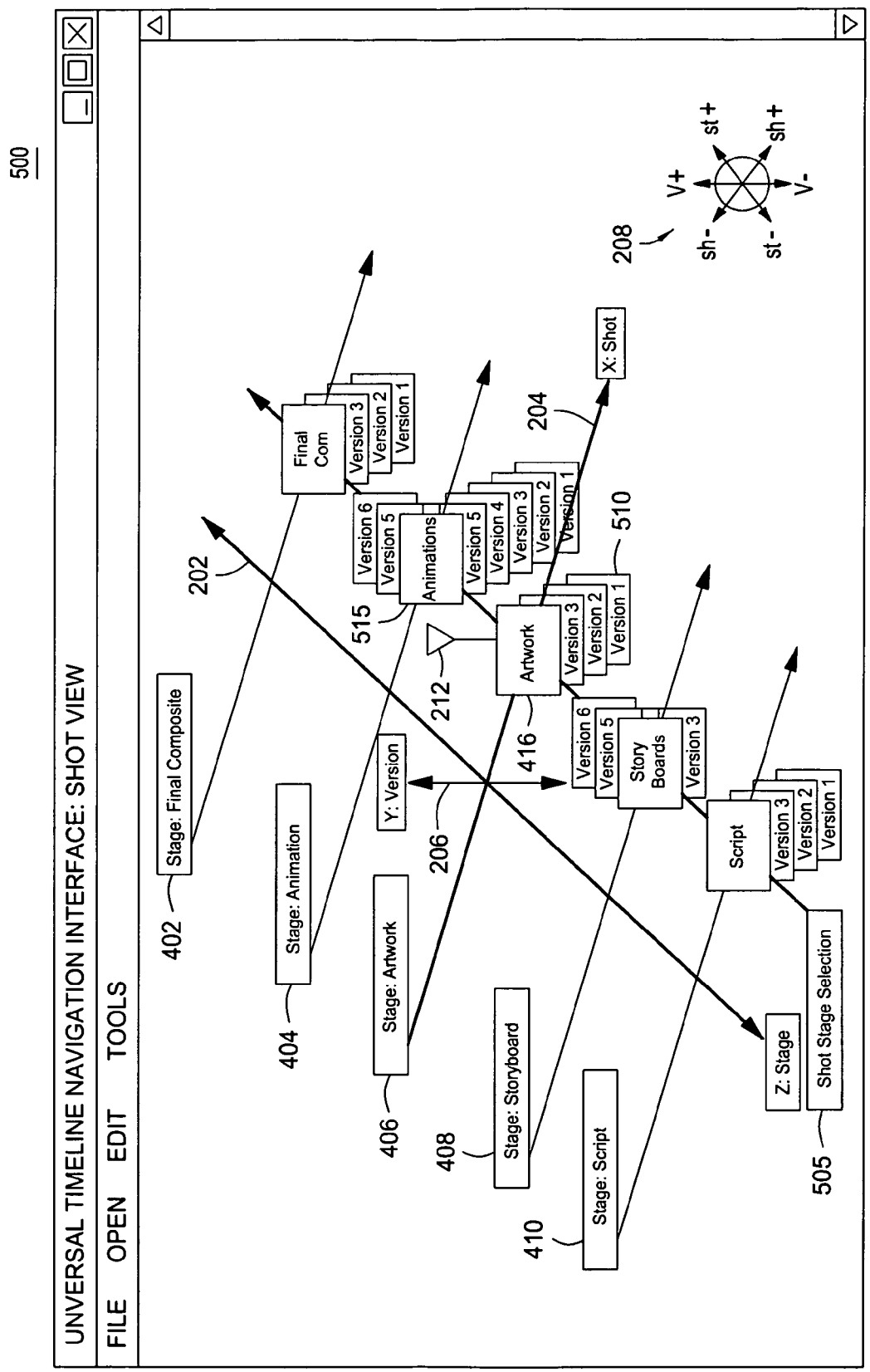
FIG. 5 further illustrates another exemplary screenshot of the universal timeline interface first illustrated in FIG. 2, according to another embodiment of the invention.

FIG. 5 illustrates another exemplary screenshot 500 of the universal timeline interface 108, according to another embodiment of the invention. As shown, the related stage selection 505 highlights a collection of related data lockets. In one embodiment, related data lockets metadata 336 is used to identify data lockets that share related data elements. Also, screenshot 500 displays a stage selection 505 that includes data lockets from a "script" stage 410, a "storyboard" stage 408, an "artwork" stage 406, an "animations" stage 404, and a "final composite" stage 402. Selection indicator 212 indicates that data locket 416 of the "artwork" stage 406 is currently selected. Additionally, the stage selection 505 also displays both prior and subsequent versions for the data lockets included in the stage selection. For example, data locket 510 is represents "version 1" of the artwork data locket 416.

Figure 6:
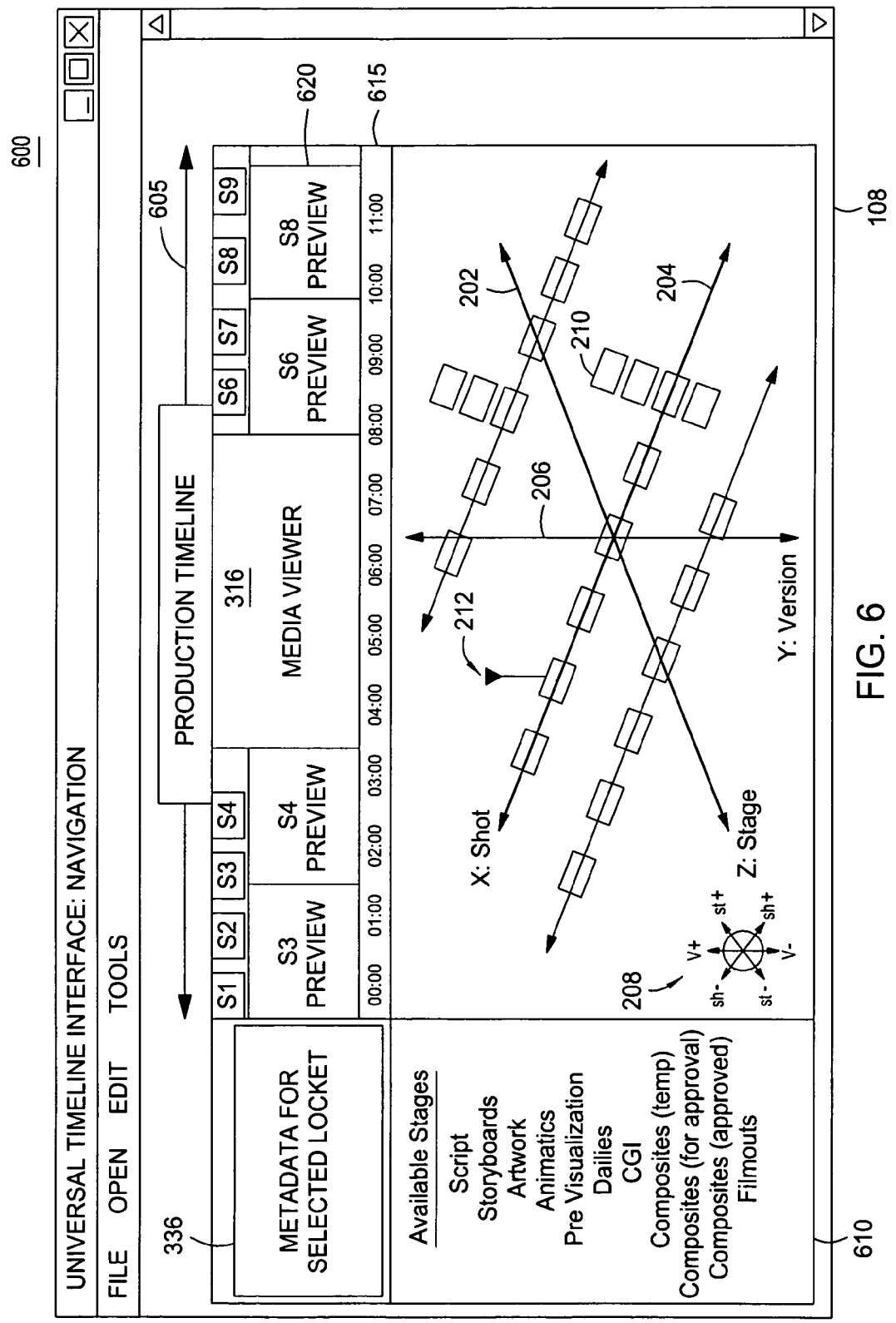
FIG. 6 illustrates another exemplary screenshot view of a universal timeline interface, according to another embodiment of the invention.

FIG. 6 illustrates another exemplary screenshot 600 of a universal timeline interface, according to another embodiment of the invention. FIG. 6 illustrates a rich navigation interface that shows a user defined set (i.e., a collection of stages laid out on a timeline). As shown, the interface 600 includes elements of both the universal timeline interface 108 illustrated in FIGS. 2, 4 and 5, along with elements of the data locket view 350 illustrated in FIG. 3B. Universal timeline interface 108 includes icons representing data lockets in multiple stages. Each stage includes a sequence of data lockets along the X-axis 204 of the universal timeline 108. Display region 610 shows each of the stages that may be displayed on universal timeline 108. In one embodiment, by selecting one of the stages from region 610, the universal timeline interface 108 may switch to a stage view like the one illustrated in FIG. 4 for the selected stage, highlighting the data elements from the selected stage. Additionally, viewer area 316 displays the content of the current data locket (in this case data locket 212) using the appropriate viewer 120, and production timeline 605 displays an indication of the data lockets associated with data locket 212. In addition to the current data locket being displayed in display region 316, previews 620 of both previous and subsequent data lockets may be displayed. Thus, a user may be provided with an indication of what came before, and after, the current data lock in the production timeline.

Typically, previews S1-S9 represent reels of film show during a particular production. The preview frames represent the selected nodes of a set (i.e. the stages and timelines available for navigation by a given user). Collectively, the previews, stages, timelines and lockets provide a view of the project created for the user of the interface 600 and assembled from the contents of the production database 102. Timeline 605 is a GUI element allows the user to navigate navigation through the lockets of a selected timeline swiftly and efficiently. The temporal scope of the set may be defined by timeline ruler 615. As shown, timeline ruler 615 runs from 00:00-11:00 representing the timecode (i.e., a marker given to each reel of film). In this example, 00:00 represents hour 0, 01:00 represents hour 1, etc. (i.e., each point lines up with a reel. Typically, each reel starts on an hour boundary, independent of the amount of material on each reel (however, current industry practice usually limits each reel to approximately 20 minutes).

Note, however, the views illustrated in FIGS. 3B-6 are not exhaustive of the different configurations that may be used to display a universal timeline interface 108. For example, an additional configuration may include a display of multiple versions of a single data element organized using data lockets plotted along the Y-axis 206 of the universal timeline interface. This, and other configurations developed to suit the needs of a particular user are within the scope of the present invention.

Figure 7:
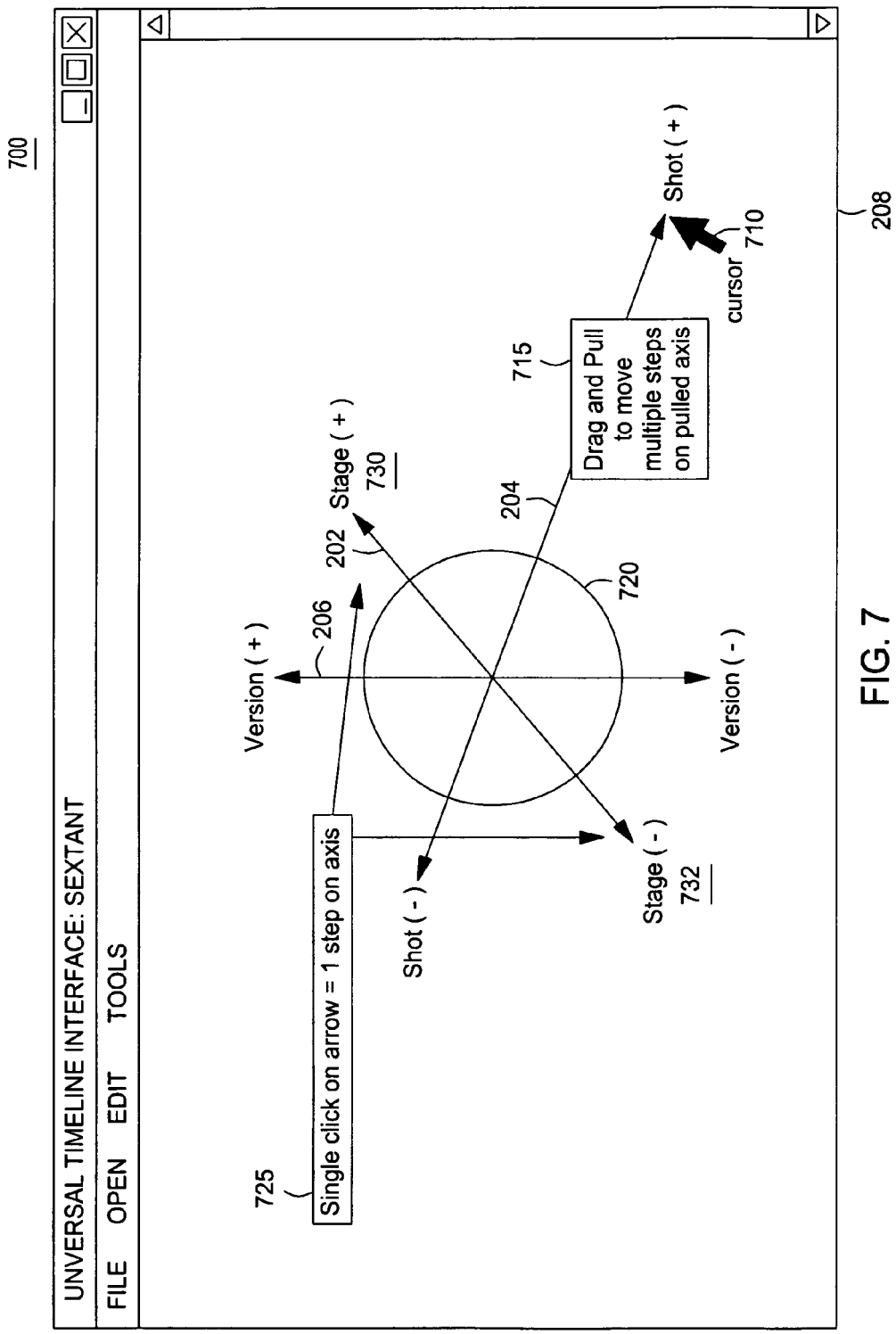
FIG. 7 illustrates a 3D navigational sextant used to navigate through a universal timeline, according to one embodiment of the invention.

FIG. 7 illustrates an exemplary screenshot 700 illustrating an embodiment of a navigational sextant 208 used to navigate through a universal timeline interface. The navigational sextant 208 includes the X-axis 204, Y-axis 206, and Z-axis 202 of the universal timeline. Coupled with the scope selection tools shown in FIG. 8, the navigational sextant 208 allows a variety of users to navigate across boundaries created by the three axes in an efficient and intuitive manner. In addition by creating different sets (i.e., a group of stages, each set out on the appropriate timeline) allow different departments to define their own media requirements and timelines.

As shown, the end of each axis includes either a "(+)" indicator or a "(−)" indicator. For example, indicators 730 and 732 correspond to the Z-axis 202 of the universal timeline interface. Positioning the mouse cursor 710 over one of these endpoints and clicking the mouse button allows a user to navigate along any one of the three axes of the universal timeline using a single step at a time. In another embodiment, the sextant may also provide a gestural navigation feature. For example, by selecting an endpoint of one of the three axes and dragging the mouse cursor, the user may change the view displayed by universal timeline interface 108 by any desired amount of data lockets.

Figure 8:
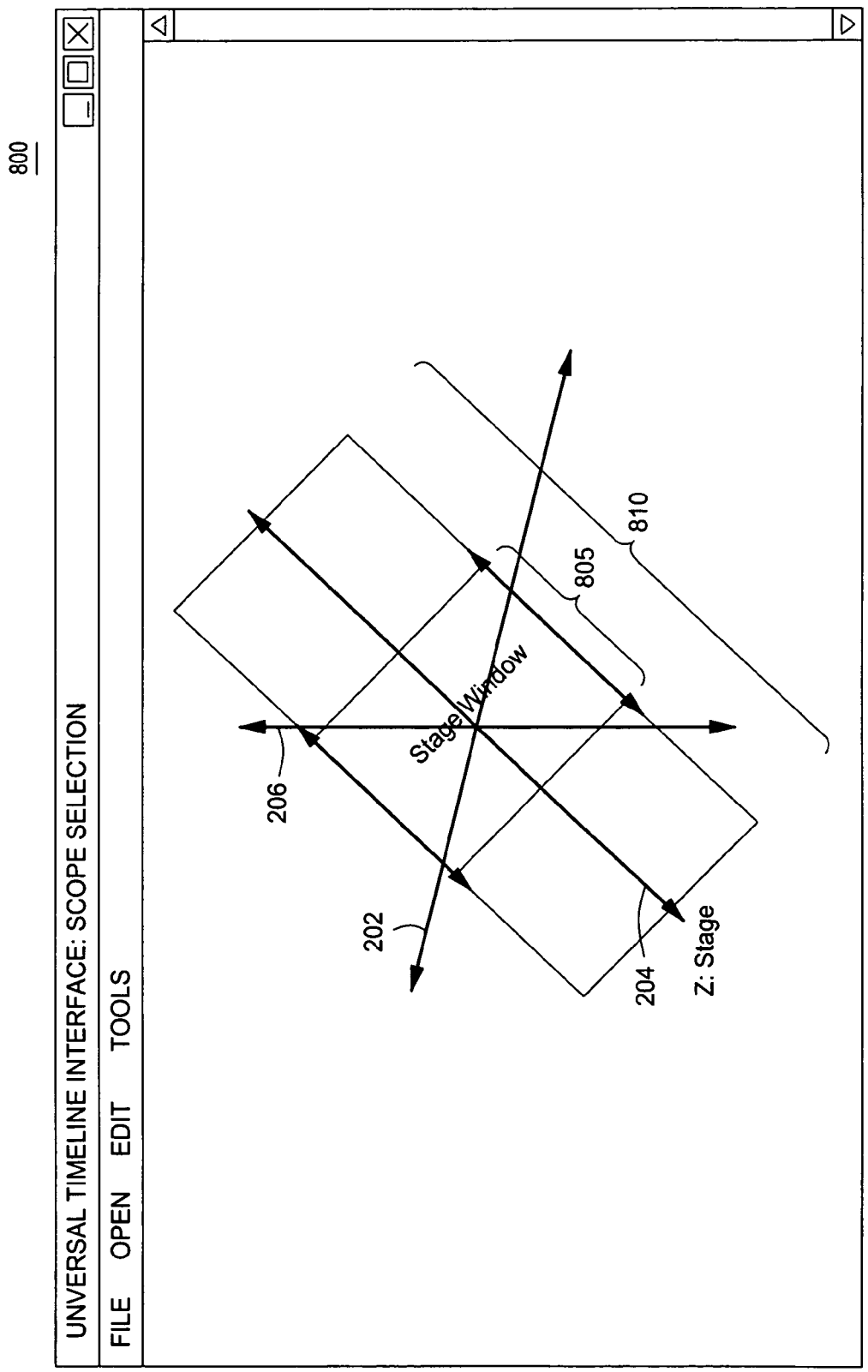
FIG. 8 illustrates an exemplary screenshot used to select a scope of data lockets displayed by the universal timeline interface, according to one embodiment of the invention.

FIG. 8 illustrates an exemplary screenshot used to select a scope of data lockets displayed by the universal timeline interface 108, according to one embodiment of the invention. FIGS. 4-6 show a particular segment of the universal timeline selected from the complete collection data lockets available from production database 102. FIG. 8 illustrates which set of data lockets are currently "in-scope" using stage window 805, and the complete collection using stage area 810. By dragging the stage window 805 along the Z-axis 202, the stage window 805 "covers" a different selection of data lockets. A similar interface may be used to select a display window for the X-axis 204 and Y-axis 206.

Figure 9:
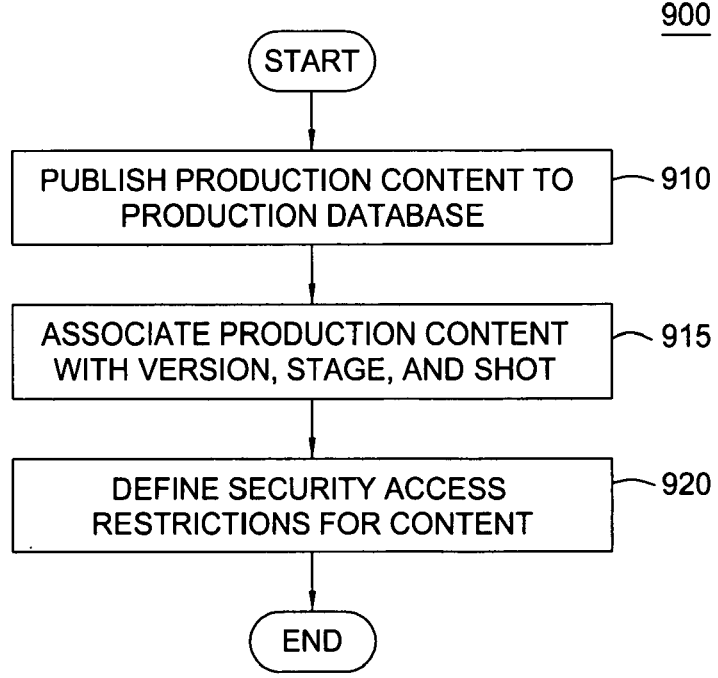
FIG. 9 illustrates a method for publishing production content to a production database, used to provide the universal timeline for a multimedia production, according to one embodiment of the invention.

FIG. 9 illustrates a method 900 for publishing data elements to the production database 102, according to one embodiment of the invention. As described above, the production database 102 may store all of the content, in whatever form, related to a particular production. The method begins at step 910 where a data element is published to production database 102. For example, production company 112, CGI animation studio 114, or editing studio 116 may each be authorized to publish content to the production database 102. At step 915, the content being published to the production database is associated with a version, stage and shot. That is, data regarding the location of the data element on the X-, Y-, and Z-axes of the universal timeline is defined. This enables the data content 326 to be associated with a data locket and displayed on the universal timeline interface. At step 920 any access restrictions for the content may be specified. For example, access restrictions may specify that CGI elements may be viewed only by the production company 112 and the particular studio generating the CGI element.

Figure 10:
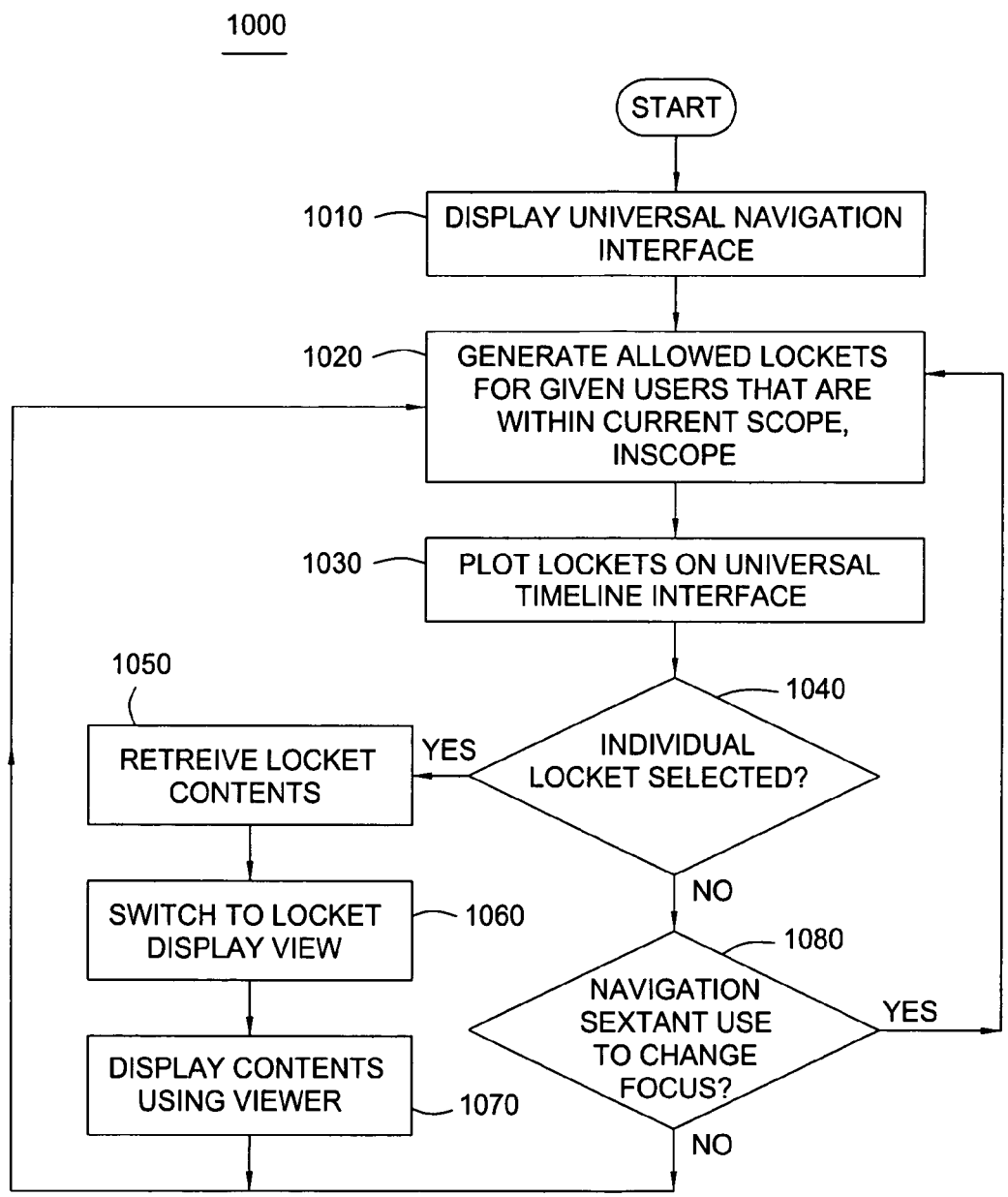
FIG. 10 illustrates a method for navigating a universal timeline interface, according to one embodiment of the invention.

FIG. 10 illustrates a method 1000 for navigating a universal timeline interface, according to one embodiment of the invention. The method begins at step 1010 where the universal timeline application 110 displays the universal timeline interface. Accordingly, at step 1010 the X-, Y-, and Z-axes 204, 206, and 202 are displayed. At step 1020, the interface 108 displays a collection of icons representing data lockets. The particular collection may depend on both the current scope of the universal interface display (i.e., the data lockets within stage window 805), as well the access restrictions for the user interacting with the universal timeline interface 108. Once the appropriate set of data lockets is determined, icons representing these data lockets may be plotted on the X-axis 204, Y-axis 206, and Z-axis 202 of the universal timeline. At step 1040, once the icons are displayed, the universal timeline interface 108 may be configured to wait for a user to select an icon representing an individual data locket or for the user to change the current focus of the universal timeline interface using navigation sextant 208.

If the user selects to change the focus of the universal timeline interface, then at step 1080, the method returns to step 1020 where the universal timeline application 110 retrieves any additional data lockets that are now within the new scope 805. These icons are then plotted on the display presented on universal timeline interface 108. Simultaneously, any data lockets no longer "in-scope" may be removed from the display presented on universal timeline interface 108.

If the user selects to view the data content 326 associated with one of the data lockets displayed on the universal timeline, than at step 1050, the universal timeline interface 108 may be configured to retrieve the data element 326 corresponding to the shot, stage, and version of the selected data locket from production database 102. At step 1060, the universal timeline interface 108 may switch to a data locket display view. For example, the user interface of FIG. 6 may be presented showing a particular locket in context of those before and after on the timeline. Alternatively, the user interface of FIG. 3B which shows the locket in context of other versions of that same material. The actual interface may be a matter of configuration settings selected by a particular user. An example usage would be where a director is interested to see the timing of a computer animated sequence and does not necessarily need to know what elements were used to construct that sequence. In such a case, the timeline interface may be configured to show only what is relevant to the director.

The process of selecting data lockets, navigating through any of the X-axis 204, Y-axis 206, and Z-axis 202 of the universal timeline may continue as needed based on user discretion. A user may continue to access, view and manage any of the data elements from production database 102 using the intuitive, easily navigable, three-dimensional display provided by the universal timeline interface 108.

Thus, embodiments of the invention may be configured to provide production staff (e.g., directors, producers) and creative staff (e.g., writers, artists, animators, etc), with an appropriate window into the production database 102 from any location. Further, the universal timeline application 110 allows these different participants in the production to view various stages of the production, e.g., different shots, versions, and stages, including possibly all of the data elements in the production database. Moreover, by displaying elements of the production database plotted along the universal timeline users may determine at a glance the current status of different aspects of the overall production, as well as determine how a given data element relates to the production as a whole, based on its position on the universal timeline.

What is claimed is:

1. A computer-implemented method for managing and coordinating a production via a universal timeline application executing on a computer system, the method comprising:

storing a plurality of sets of data elements related to the production in a production database;

displaying a universal timeline represented as a three dimensional grid, wherein each axis of the grid corresponds to a different data element type stored in the production database;

displaying a first data locket on the universal timeline to represent a first set of data elements stored in the production database;

displaying a second data locket on the universal timeline to represent a second set of data elements stored in the production database; and displaying a third data locket on the universal timeline to represent a third set of data elements stored in the production database, wherein a value for a first data element type associated with the first data locket is the same as a value for the first data element type associated with the second data locket, a value for a second data element type associated with the first data locket is the same as a value for the second data element type associated with the second data locket, and a value for a third data element type associated with the first data locket is not the same as a value for the third data element type associated with the second data locket, and wherein the value for the first data element type associated with the first data locket is the same as a value for the first data element type associated with the third data locket, the value for the second data element type associated with the first data locket is not the same as a value for the second data element type associated with the third data locket, and the value for the third data element type associated with the first data locket is the same as a value for the third data element type associated with the third data locket.

2. The method of claim 1, wherein the production comprises a multimedia production.

3. The method of claim 2, wherein an X-axis of the universal timeline corresponds to the first data element type and represents a production timeline of the multimedia production, wherein a Y-axis of the universal timeline corresponds to the second data element type and represents versions of data stored in the production database, and wherein a Z-axis of the universal timeline corresponds to the third data element type and represents different stages of data stored in the production database.

4. The method of claim 1, further comprising, invoking an application viewer configured to display the first set of data elements represented by the first data locket.

5. The method of claim 1, wherein a graphical navigation sextant is configured to allow a user to navigate the universal timeline interface by traversing through an X-axis, Y-axis or Z-axis of universal timeline.

6. The method of claim 1, wherein the first data locket associated with the first set of data elements further specifies an access restriction specifying whether a user is allowed to view or modify values for the data elements included in the first set of data elements represented by the first data locket.

7. The method of claim 1, wherein the first set of data elements comprises computer-generated content intended to be included a multimedia production.

8. A computer-readable storage medium, excluding signal bearing media, that contains a universal timeline application that, when executed on a computer system, performs operations for managing and coordinating a production, including the steps of:

storing a plurality of sets of data elements related to the production in a production database;

displaying a universal timeline represented as a three dimensional grid, wherein each axis of the grid corresponds to a different data element type stored in the production database;

displaying a first data locket on the universal timeline to represent a first set of data elements stored in the production database;

displaying a second data locket on the universal timeline to represent a second set of data elements stored in the production database; and displaying a third data locket on the universal timeline to represent a third set of data elements stored in the production database, wherein a value for a first data element type associated with the first data locket is the same as a value for the first data element type associated with the second data locket, a value for a second data element type associated with the first data locket is the same as a value for the second data element type associated with the second data locket, and a value for a third data element type associated with the first data locket is not the same as a value for the third data element type associated with the second data locket, and wherein the value for the first data element type associated with the first data locket is the same as a value for the first data element type associated with the third data locket, the value for the second data element type associated with the first data locket is not the same as a value for the second data element type associated with the third data locket, and the value for the third data element type associated with the first data locket is the same as a value for the third data element type associated with the third data locket.

9. The computer-readable medium of claim 8, wherein the production comprises a multimedia production.

10. The computer-readable medium of claim 9, wherein an X-axis of the universal timeline corresponds to the first data element type and represents a production timeline of the multimedia production, wherein a Y-axis of the universal timeline corresponds to the second data element type and represents versions of data stored in the production database, and wherein a Z-axis of the universal timeline corresponds to the third data element type and represents different stages of data stored in the production database.

11. The computer-readable medium of claim 8, wherein the steps further comprise, invoking an application viewer configured to display the first set of data elements represented by the first data locket.

12. The computer-readable medium of claim 8, wherein a graphical navigation sextant is configured to allow a user to navigate the universal timeline interface by traversing through an X-axis, Y-axis, or Z-axis of universal timeline.

13. The computer-readable medium of claim 8, wherein the first data locket associated with the first set of data elements further specifies an access restriction specifying whether a user is allowed to view or modify values for the data elements included in the first set of data elements represented by the first data locket.

14. The computer-readable medium of claim 8, wherein the first set of data elements comprises computer-generated content intended to be included a multimedia production.

15. A computing device comprising:

a processor; and a memory configured to store an application that includes instructions which, when executed by the processor, cause the processor to perform operations for managing and coordinating a production, comprising:

storing a plurality of sets of data elements related to the production in a production database;

displaying a universal timeline represented as a three dimensional grid, wherein each axis of the grid corresponds to a different data element type stored in the production database;

displaying a first data locket on the universal timeline to represent a first set of data elements stored in the production database;

displaying a second data locket on the universal timeline to represent a second set of data elements stored in the production database; and displaying a third data locket on the universal timeline to represent a third set of data elements stored in the production database, wherein a value for a first data element type associated with the first data locket is the same as a value for the first data element type associated with the second data locket, a value for a second data element type associated with the first data locket is the same as a value for the second data element type associated with the second data locket, and a value for a third data element type associated with the first data locket is not the same as a value for the third data element type associated with the second data locket, and wherein the value for the first data element type associated with the first data locket is the same as a value for the first data element type associated with the third data locket, the value for the second data element type associated with the first data locket is not the same as a value for the second data element type associated with the third data locket, and the value for the third data element type associated with the first data locket is the same as a value for the third data element type associated with the third data locket.

16. The computing device of claim 15, wherein the production comprises a multimedia production.

17. The computing device of claim 16, wherein an X-axis of the universal timeline corresponds to the first data element type and represents a production timeline of the multimedia production, wherein a Y-axis of the universal timeline corresponds to the second data element type and represents versions of data stored in the production database, and wherein a Z-axis of the universal timeline corresponds to the third data element type and represents different stages of data stored in the production database.

18. The computing device of claim 15, wherein the operations further comprise, invoking an application viewer configured to display the first set of data elements represented by the first data locket.

19. The computing device of claim 15, wherein a graphical navigation sextant is configured to allow a user to navigate the universal timeline interface by traversing through an X-axis, Y-axis, or Z-axis of universal timeline.

20. The computing device of claim 15, wherein the first data locket associated with the first set of data elements further specifies an access restriction specifying whether a user is allowed to view or modify values for the data elements included in the first set of data elements represented by the first data locket.

* * * * *